United States Patent
Wang

(10) Patent No.: US 8,760,862 B2
(45) Date of Patent: Jun. 24, 2014

(54) HEAT DISSIPATING DEVICE AND PORTABLE ELECTRONIC DEVICE USING THE SAME

(75) Inventor: Cheng-Yu Wang, Taipei (TW)

(73) Assignee: Asustek Computer Inc., Taipei (TW)

( * ) Notice: Subject to any disclaimer, the term of this patent is extended or adjusted under 35 U.S.C. 154(b) by 233 days.

(21) Appl. No.: 13/343,882

(22) Filed: Jan. 5, 2012

(65) Prior Publication Data

US 2012/0170209 A1 Jul. 5, 2012

Related U.S. Application Data

(60) Provisional application No. 61/430,123, filed on Jan. 5, 2011.

(51) Int. Cl.
*H05K 7/20* (2006.01)
(52) U.S. Cl.
USPC ............ 361/679.48; 361/679.47; 361/679.52; 361/679.54; 361/695; 361/700; 165/80.2; 165/122; 165/126; 165/104.33; 454/184
(58) Field of Classification Search
USPC ............... 361/679.46–679.55, 690–697, 698, 361/699, 700–715, 719–727; 165/80.2, 165/80.3, 80.4, 80.5, 104.14, 104.26, 165/104.33, 104.34, 121–126, 185; 174/15.1, 16.3, 252; 454/184; 257/706–727

See application file for complete search history.

(56) References Cited

U.S. PATENT DOCUMENTS

| | | | | |
|---|---|---|---|---|
| 6,529,375 | B2 * | 3/2003 | Miyahara et al. | 361/697 |
| 6,909,602 | B2 * | 6/2005 | Dietrich et al. | 361/679.08 |
| 6,980,418 | B1 * | 12/2005 | Seeger et al. | 361/679.54 |
| 7,474,526 | B2 * | 1/2009 | Fujiwara | 361/679.52 |
| 7,511,956 | B2 * | 3/2009 | Tomioka et al. | 361/697 |
| 7,535,712 | B2 * | 5/2009 | Tanaka | 361/700 |
| 7,643,284 | B2 * | 1/2010 | Nakamura | 361/679.47 |
| 7,649,736 | B2 * | 1/2010 | Hongo | 361/679.47 |
| 7,710,724 | B2 * | 5/2010 | Takeguchi et al. | 361/700 |
| 7,903,402 | B2 * | 3/2011 | Tomioka et al. | 361/679.47 |
| 8,305,758 | B2 * | 11/2012 | Chu et al. | 361/700 |
| 2008/0123298 | A1 * | 5/2008 | Takeguchi et al. | 361/702 |
| 2009/0201639 | A1 * | 8/2009 | Wang et al. | 361/679.54 |

FOREIGN PATENT DOCUMENTS

| | | |
|---|---|---|
| TW | 460108 | 10/2001 |
| TW | M291194 | 5/2006 |
| TW | M295883 | 8/2006 |

* cited by examiner

*Primary Examiner* — Michail V Datskovskiy
(74) *Attorney, Agent, or Firm* — Muncy, Geissler, Olds & Lowe, P.C.

(57) ABSTRACT

A portable electronic device, which including a casing, a circuit board, a fan and a heat dissipating device, is disclosed. The circuit board is disposed in the casing and includes at least one electronic component thereon. The fan is disposed in the casing. The heat dissipating device is disposed in the casing and near the side of an air outlet of the fan. Gaps formed between the outer surfaces of the heat dissipating device and the inner surfaces of the casing as air flow channels. The portable electronic device isolates heat conducted to the casing of the portable electronic device via the gaps.

12 Claims, 6 Drawing Sheets

HEAT DISSIPATING DEVICE AND PORTABLE ELECTRONIC DEVICE USING THE SAME

CROSS REFERENCE TO RELATED APPLICATIONS

The non-provisional patent application claims priority to U.S. provisional patent application with Ser. No. 61/430,123 filed on Jan. 5, 2011. This and all other extrinsic materials discussed herein are incorporated by reference in their entirety.

BACKGROUND OF THE INVENTION

1. Field of Invention

The invention relates to a heat dissipating device and, more particularly, to a heat dissipating device of a portable electronic device.

2. Related Art

Nowadays, computers are important in our life. Currently, a portable electronic device is characterized in light, thin and small, therefore it is widely used. However, the portable electronic device may have problems in heat dissipating.

Taking a notebook computer as an example, FIG. 1 is a top view showing a conventional notebook computer land its heat dissipating fan 12 and the het dissipating fins 13 thereof. The conventional notebook computer 1 dissipates heat of the heat dissipating fins 13 by the heat dissipating fan 12, disposed in a casing 11 of the conventional notebook computer 1, and the heat dissipating fan 12 blows hot air out of the casing 11. In consideration of the small size and the performance, the space for disposing the heat dissipating fan 12 becomes smaller. As a result, the heat dissipating fan 12 only can be disposed at a palm rest area 14.

The heat dissipating fan 12 blows cool air into the heat dissipating fins 13, the cool air brings heat from the heat dissipating fins 13 and blows out of the casing 11 (shown in arrows). However, the heat dissipating fan 12 blows the hot air from the heat dissipating fins 13 out of the casing 11, resulting in temperature increasing around the casing.

SUMMARY OF THE INVENTION

A portable electronic device includes a casing, a circuit board, a fan and a heat dissipating device. The circuit board is disposed in the casing and includes at least one electronic component thereon. The fan is disposed in the casing. The heat dissipating device is disposed in the casing and at a side of an air outlet of the fan. Furthermore, a gap formed between the heat dissipating device and the casing for air flowing.

In an embodiment, the heat dissipating device includes an upper surface and a lower surface and the gap formed between the upper surface and the casing and between the lower surface and the casing, respectively.

In an embodiment, thickness of the fan is larger than that of the heat dissipating device.

In an embodiment, the casing includes at least one opening.

In an embodiment, the opening is disposed corresponding to the air outlet of the heat dissipating device.

In an embodiment, a space is formed between the opening and the air outlet of the heat dissipating device.

In an embodiment, the portable electronic device further includes a keyboard module disposed in the casing, and the fan and the heat dissipating device are disposed adjacent to one side of the keyboard module.

In an embodiment, the casing includes a plurality of air inlets formed at the side of the keyboard module opposite to the side of the fan and the heat dissipating device.

In an embodiment, a plurality of through holes are formed at the circuit board corresponding to the air inlets.

In an embodiment, the shape of the air inlets is the same as the shape of the through holes at the circuit board.

In an embodiment, the heat dissipating device includes a plurality of heat dissipating fins and at least one heat pipe.

In an embodiment, the electronic component includes one of a central processing unit (CPU), a chipset, a graphic processing unit (GPU), a video graphics array (VGA) and a memory.

In an embodiment, the fan further includes an upper cover and a lower cover, the height between the upper cover and the lower cover is larger than the height of the heat dissipating device, the heat dissipating device is disposed between the upper cover and the lower cover, and gaps are formed between the heat dissipating device and the upper cover and between the heat dissipating device and the lower cover, respectively.

In an embodiment, the fan further includes an upper cover, a lower cover, an upper block board connected to the upper cover and a lower block board connected to the lower cover, the height between the upper block board and the lower block board is larger than the height of the heat dissipating device, the heat dissipating device is disposed between the upper block board and the lower block board, and a gap formed between the heat dissipating device and the upper block board and formed between the heat dissipating device and the lower block board, respectively.

As stated above, in the portable electronic device as disclosed herein, air flow channels are formed via the gaps exist between the outer surface of the heat dissipating device and the inner surface of the casing, between the upper cover and the lower cover of the fan, or between the upper block board and the lower block board of the fan. Thus, the cool air from the fan flows through the air flow channel to isolate the heat of the heat dissipating device from contacting with the casing, so as to prevent heat of the heat dissipating device from conducting to the casing, and the user would not feel uncomfortable when he or she puts the hands at the casing. Furthermore, the cool air from the fan flows through the heat dissipating device, and takes the heat of the heat dissipating device away through the opening of the casing, so as to avoid temperature increasing on the casing or around the casing.

These and other features, aspects and advantages of the present invention will become better understood with regard to the following description, appended claims, and accompanying drawings.

DETAILED DESCRIPTION OF THE INVENTION

A portable electronic device is illustrated with relating figures, and the same symbols denote the same components.

Figure 1:
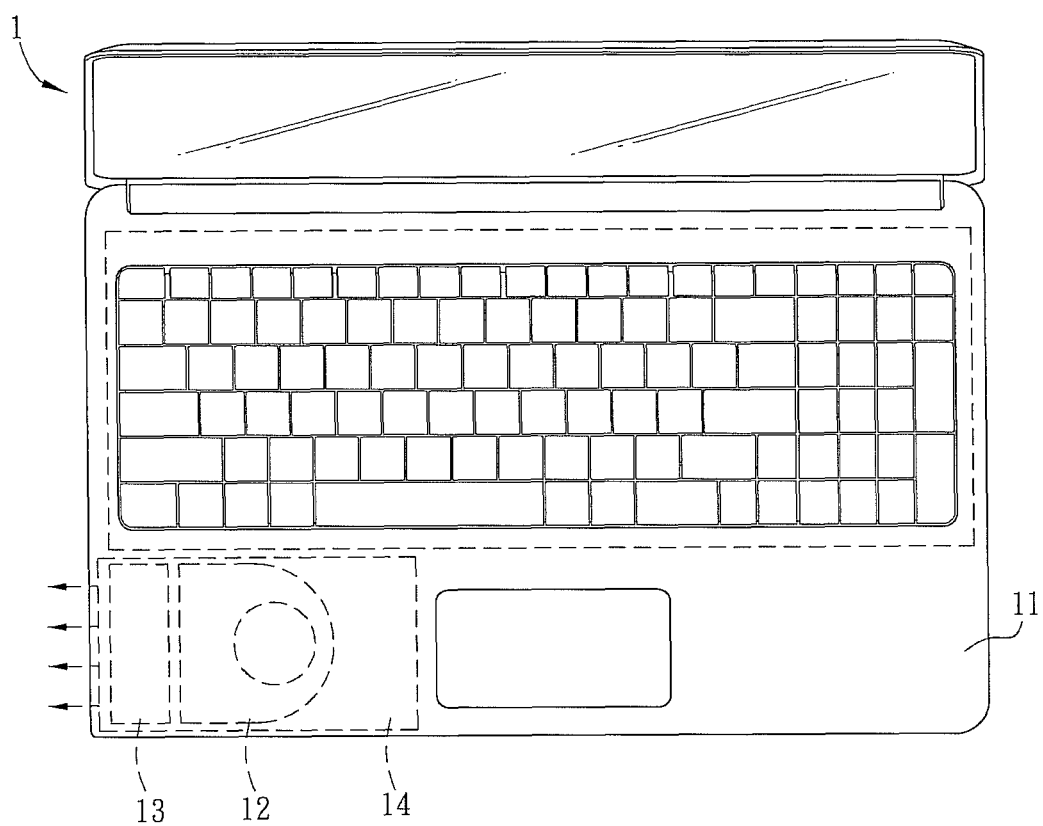
FIG. 1 is a top view showing a conventional portable electronic device with its heat dissipating fan and heat dissipating fins.
Figure 2A:
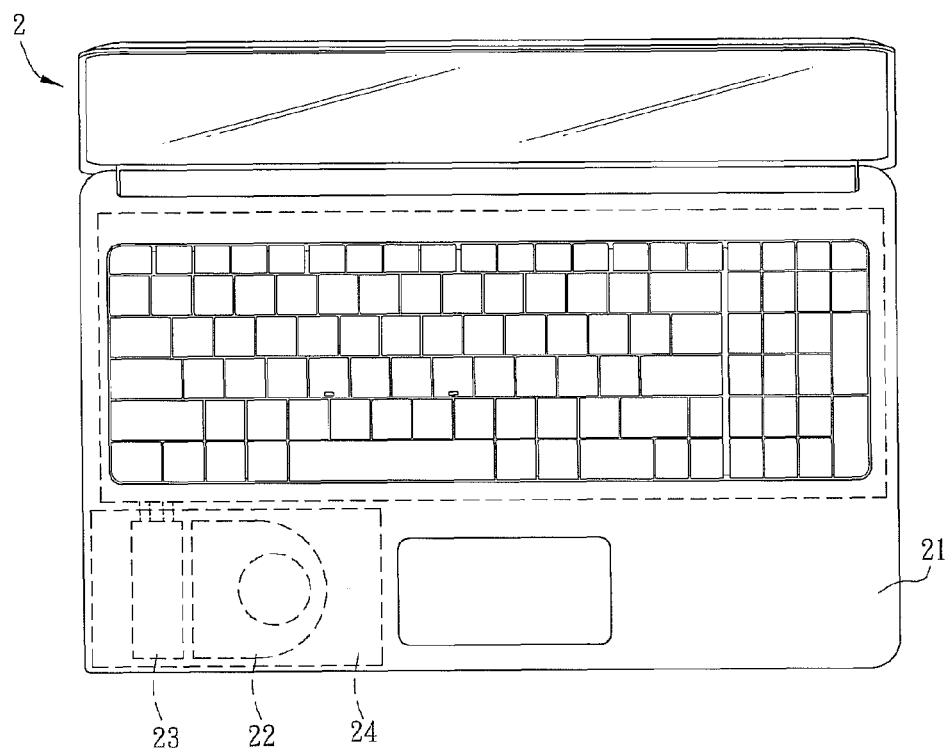
FIG. 2A and FIG. 2B are respectively a top view and a front view showing the fan and the heat dissipating device of the portable electronic device in an embodiment.
Figure 2B:
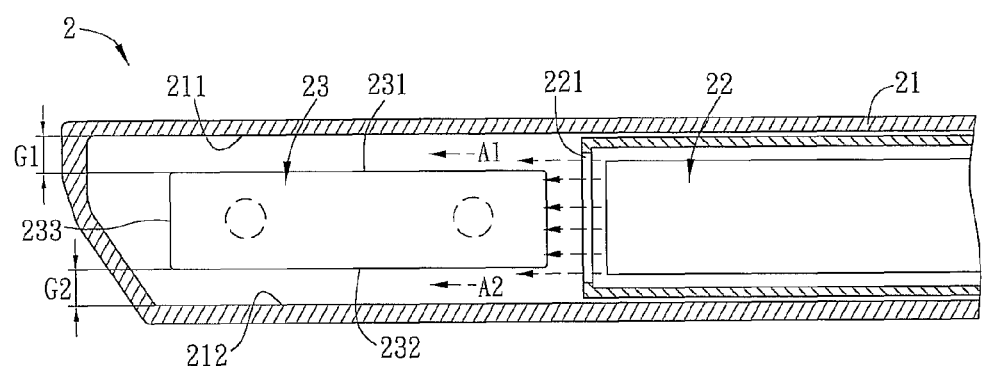

FIG. 2A and FIG. 2B are top views and front views respectively showing a fan 22 and a heat dissipating device 23 of a portable electronic device 2 in an embodiment. Taking a notebook computer 2 as an example, it includes a casing 21, a circuit board (not shown), a fan 22 and a heat dissipating device 23. The circuit board is disposed in the casing 21, and the electronic components such as a central processing unit (CPU), a chipset, a graphic processing unit (GPU), a video graphics array (VGA) and a memory is selectively disposed on the circuit board as requirement, which is not limited herein. The fan 22 and the heat dissipating device 23 are disposed in the casing 21, and the heat dissipating device 23 is disposed at a side of an air outlet 221 of the fan 22. Gaps G1 and G2 exist between the outer surface 231, 232 of the heat dissipating device 23 and the inner surface 211, 212 of the casing 21, respectively.

In FIG. 2B, the gap G1 exists between the upper surface 231 of the heat dissipating device 23 and the inner surface 211 of the casing 21, and the gap G2 exists between the lower surface 232 of the heat dissipating device 23 and the inner surface 212 of the casing 21. That is, the gap G1 forms an upper air flow channel, as indicated by an arrow A1, and the gap G2 forms a lower air flow channel, as indicated by an arrow A2. The term "air flow channel" means a channel which air flows through. That is, the fan 22 blows cool air through the air flow channel to isolate the heat of the heat dissipating device 23 from contacting with the casing 21, and thus the user would not feel uncomfortable when he or she puts the hands at the palm rest area 24 due to the temperature increasing of the casing 21.

Figure 3:
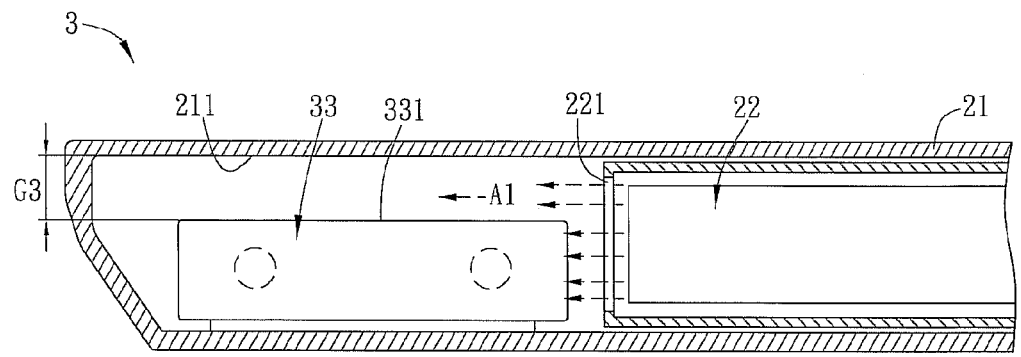
FIG. 3 is a front view showing the portable electronic device with its fan and the heat dissipating device in an embodiment.

FIG. 3 is a front view showing a fan 21 and a heat dissipating device 33 of a notebook computer 3 in an embodiment. Specifically, as showed in FIG. 2B, the two gaps G1 and G2 formed between the outer surface 231, 232 of the heat dissipating device 23 and the inner surface 211, 212 of the casing 21, respectively, is not limited herein. As shown in FIG. 3, a gap G3 also may be formed between the upper surface 331 of the heat dissipating device 33 and the inner surface 211 of the casing 21, which is the upper air flow channel, so as to prevent the heat of the heat dissipating device 33 from conducting to the inner surface 211 of the casing 21 and avoid the temperature increasing of the casing 21.

The heat dissipating device may include a plurality of heat dissipating fins and at least one heat pipe. Moreover, the thickness of the fan 22 may be larger than that of the heat dissipating device, that is, the height of the air outlet 221 of the fan 22 is larger than the height of the heat dissipating device. Thus, the cool air from the fan 22 can flow through the heat dissipating device, the upper air flow channel and the lower air flow channel.

Figure 4A:
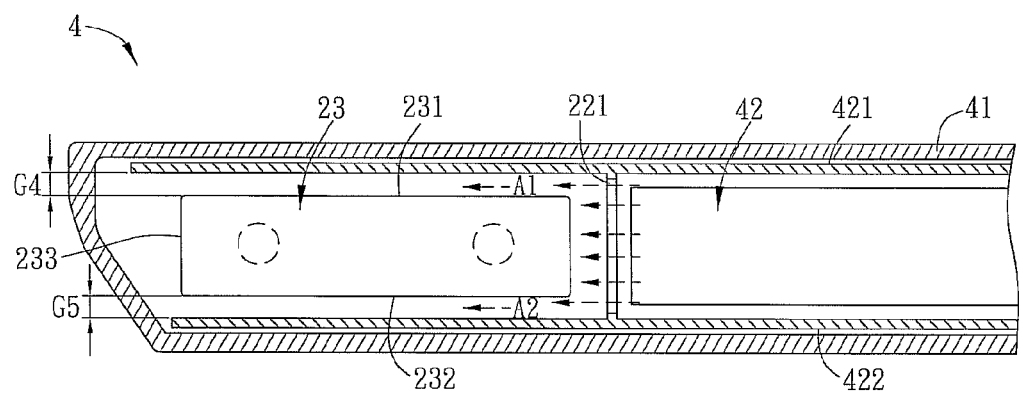
FIG. 4A is a front view showing the portable electronic device with its fan and the heat dissipating device in an embodiment.

FIG. 4A is a front view showing a fan 42 and a heat dissipating device 23 of a notebook computer 4 in an embodiment. In this embodiment, the fan 42 includes an upper cover 421 and a lower cover 422, and the height between the upper cover 421 and the lower cover 422 is larger than that of the heat dissipating device 23. The upper cover 421 and the lower cover 422 cover the upper surface 231 and the lower surface 232 of the heat dissipating device 23, respectively. That is, the heat dissipating device 23 is disposed between the upper cover 421 and the lower cover 422. Gaps G4 and G5 are formed between the upper surface 231 and the lower surface 232 of the heat dissipating device 23, and between the upper cover 421 and the lower cover 422, respectively, to form the upper air flow channel and the lower air flow channel as shown as the arrows A1 and A2.

Figure 4B:
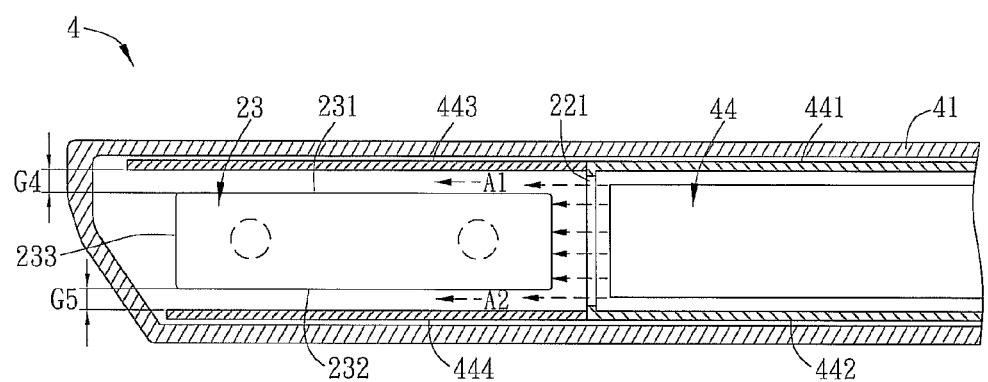
FIG. 4B is a front view showing the portable electronic device with its fan and the heat dissipating device in an embodiment.

FIG. 4B is a front view showing a fan 44 and a heat dissipating device 23 of a notebook computer 4 in an embodiment. In this embodiment, the fan includes an upper cover 441, a lower cover 442, an upper block board 443 connected to the upper cover 441 and a lower block board 444 connected to the lower cover 442, and the height between the upper block board 443 and the lower block board 444 is larger than that of the heat dissipating device 23. The upper block board 443 and the lower block board 444 cover the upper surface 231 and the lower surface 232 of the heat dissipating device 23, respectively. That is, the heat dissipating device 23 is disposed between the upper block board 443 and the lower block board 444. Gap G4 is formed between the upper surface 231 of the heat dissipating device 23 and the upper block board 443 as the upper air flow channel, and G5 is formed between the outer surface 232 of the heat dissipating device 23 and the lower block board 444 as the lower air flow channel, showed as the arrows A1 and A2.

Figure 5:
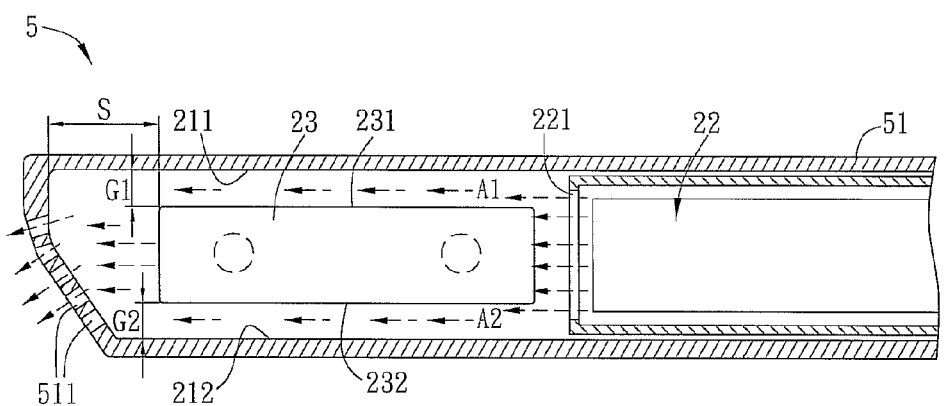
FIG. 5 is a front view showing the portable electronic device in an embodiment.

FIG. 5 is a front view showing a portable electronic device in an embodiment. The casing 51 of the notebook computer 5 includes at least one opening 511 corresponding to the air outlet 233 of the heat dissipating device 23, and thus the hot air from the heat dissipating device 23 may be blown out through the air outlet 233 of the heat dissipating device 23 and the opening 511. The opening 511 may be a hole or a slot, which is not limited herein. The shape of the hole or the slot can be adjusted according to requirements, which is not limited herein.

Moreover, a space S forms between the opening 511 and the air outlet 233 of the heat dissipating device 23. In the space, cool air from the upper surface 231 (the upper air flow channel) and the lower surface 232 (the lower air flow channel) of the heat dissipating device 23 blows through the heat dissipating device 23, and takes the heat of the heat dissipating device 23 away through the opening 511 of the casing 51 to decrease the temperature of the dissipated hot air.

Figure 6A:
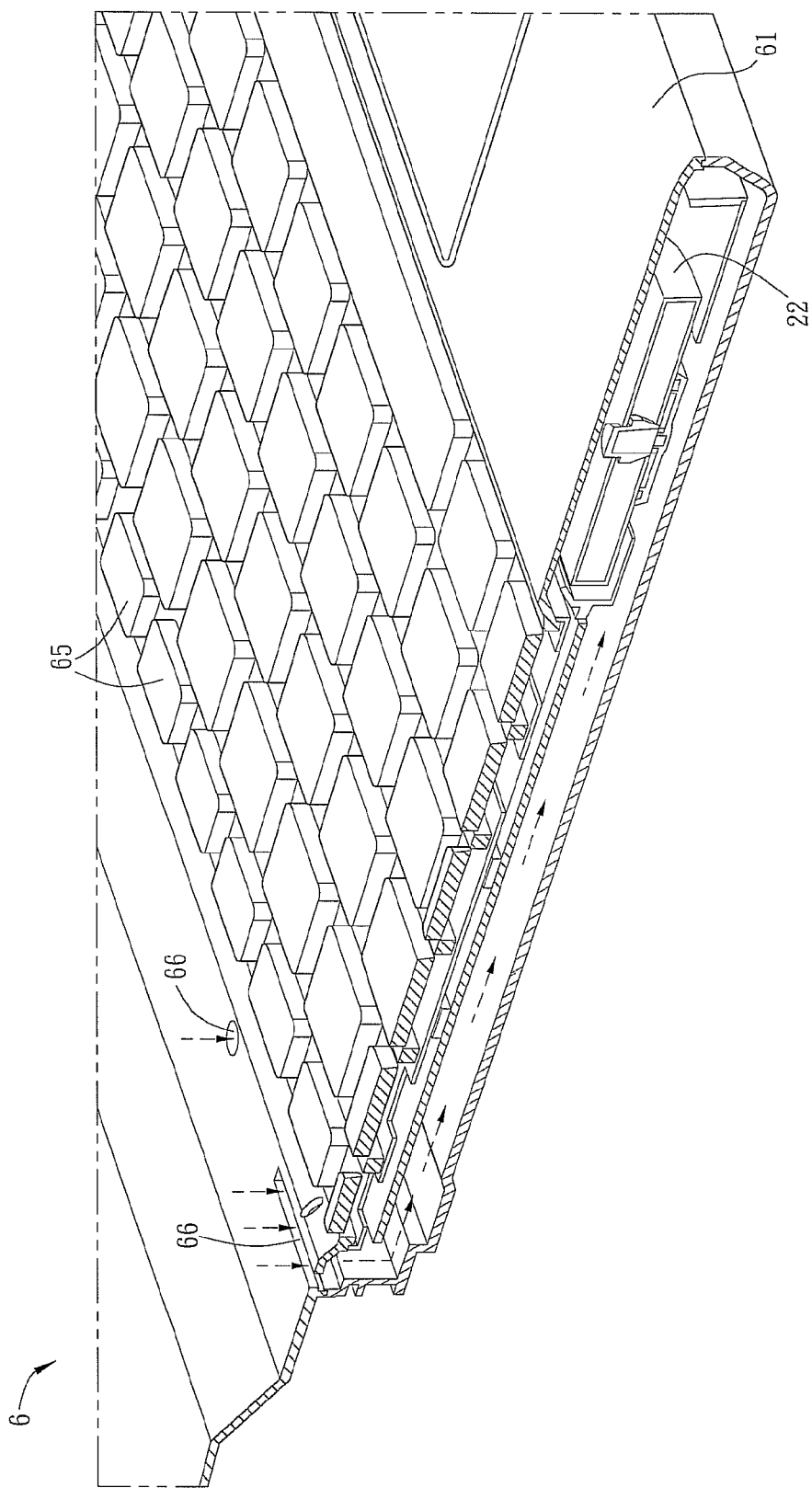
FIG. 6A is a sectional diagram showing the portable electronic device in an embodiment.
Figure 6B:
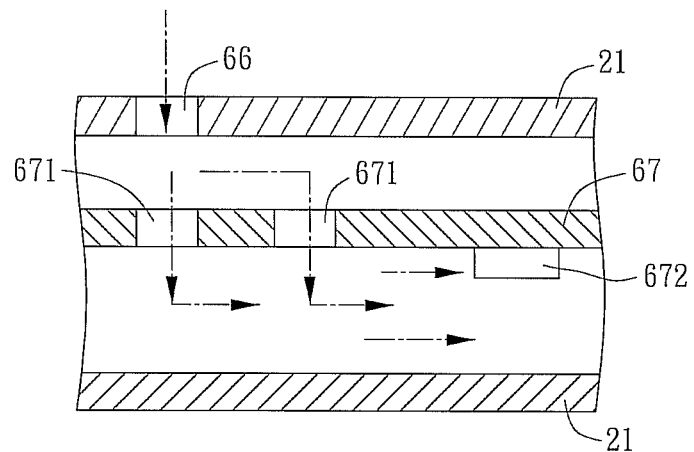
FIG. 6B and FIG. 6C are side views showing the portable electronic device in an embodiment.
Figure 6C:
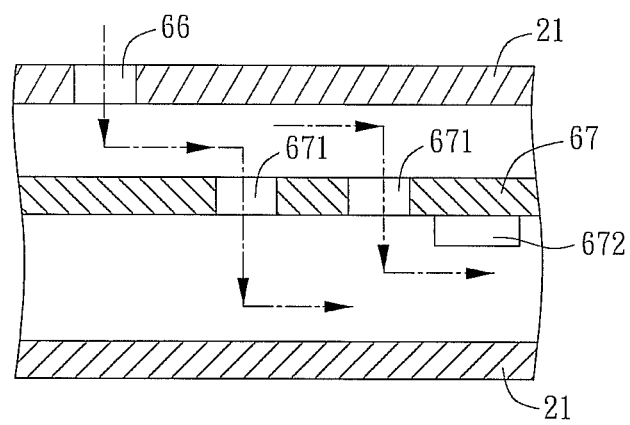

FIG. 6A, FIG. 6B and FIG. 6C are sectional diagrams showing a portable electronic device in an embodiment. Taking the notebook computer 6 as an example, it further includes a keyboard module 65 disposed in the casing 61, and the fan 22 and the heat dissipating device (not shown) are disposed adjacent to a side of the keyboard module 65. Furthermore, the casing 61 may include a plurality of air inlets 66 formed at a side of the keyboard module 65 opposite to the fan 22 and the heat dissipating device 23.

As shown in FIG. 6B, a plurality of through holes 671 are formed at the circuit board 67 corresponding to the air inlets 66, and thus external air can flow through the air inlets 66, the through holes 671 of the circuit board 67 and at least one electronic component 672 at the circuit board 67 to dissipate heat of the electronic component 672. Moreover, the air inlets 66 may not correspond to the through hole 671, as shown in FIG. 6C.

In an embodiment, the shape and the size of the air inlets 66 and the through holes 671 of the circuit board 67 may be the same or not, respectively.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A portable electronic device, comprising:
   a casing;
   a circuit board disposed in the casing and including at least one electronic component;
   a fan disposed in the casing;
   a heat dissipating device disposed in the casing and at a side of an air outlet of the fan; and
   a keyboard module disposed in the casing, and the fan and the heat dissipating device are disposed adjacent to one side of the keyboard module,
   wherein a gap is formed between the heat dissipating device and the casing for air flowing, and the casing includes a plurality of air inlets formed at the side of the keyboard module opposite to the side of the fan and the heat dissipating device.

2. The portable electronic device according to claim 1, wherein the heat dissipating device includes an upper surface and a lower surface, and the gap forms between the upper surface and the casing and between the lower surface and the casing, respectively.

3. The portable electronic device according to claim 1, wherein thickness of the fan is larger than that of the heat dissipating device.

4. The portable electronic device according to claim 1, wherein the casing includes at least one opening.

5. The portable electronic device according to claim 4, wherein the opening is disposed corresponding to the air outlet of the heat dissipating device.

6. The portable electronic device according to claim 5, wherein a space is formed between the opening and the air outlet of the heat dissipating device.

7. The portable electronic device according to claim 1, wherein a plurality of through holes are formed at the circuit board corresponding to the air inlets.

8. The portable electronic device according to claim 7, wherein the shape of the air inlets is the same as the shape of the through holes at the circuit board.

9. The portable electronic device according to claim 1, wherein the heat dissipating device includes a plurality of heat dissipating fins and at least one heat pipe.

10. The portable electronic device according to claim 1, wherein the electronic component includes one of a central processing unit (CPU), a chipset, a graphic processing unit (GPU), a video graphics array (VGA) and a memory.

11. The portable electronic device according to claim 3, wherein the fan further includes an upper cover and a lower cover, the height between the upper cover and the lower cover is larger than the height of the heat dissipating device, the heat dissipating device is disposed between the upper cover and the lower cover, and gaps are formed between the heat dissipating device and the upper cover and between the heat dissipating device and the lower cover, respectively.

12. The portable electronic device according to claim 3, wherein the fan further includes an upper cover, a lower cover, an upper block board connected to the upper cover and a lower block board connected to the lower cover, the height between the upper block board and the lower block board is larger than the height of the heat dissipating device, the heat dissipating device is disposed between the upper block board and the lower block board, and gaps are formed between the heat dissipating device and the upper block board, and between the heat dissipating device and the lower block board, respectively.

* * * * *